United States Patent [19]

Stoeckli et al.

[11] Patent Number: 4,496,596
[45] Date of Patent: Jan. 29, 1985

[54] AROMATIZING METHOD

[75] Inventors: Oscar W. Stoeckli, Rye, N.Y.; David J. Berry, Montvale, N.J.

[73] Assignee: General Foods Corporation, White Plains, N.Y.

[21] Appl. No.: 358,757

[22] Filed: Mar. 16, 1982

Related U.S. Application Data

[62] Division of Ser. No. 220,927, Dec. 29, 1980, Pat. No. 4,355,571.

[51] Int. Cl.³ .............................................. A23F 5/46
[52] U.S. Cl. ..................................... 426/388; 426/386
[58] Field of Search ............................... 426/388, 386

[56] References Cited

U.S. PATENT DOCUMENTS

| | | | |
|---|---|---|---|
| 2,825,190 | 3/1958 | Heald | 427/212 X |
| 3,148,070 | 9/1964 | Mishkin et al. | 426/386 |
| 3,769,032 | 10/1973 | Lubsen et al. | 426/388 X |
| 4,313,265 | 2/1982 | Dwyer | 426/388 X |
| 4,355,571 | 10/1982 | Stoekli et al. | 426/388 X |

Primary Examiner—Joseph Golian
Attorney, Agent, or Firm—Scully, Scott, Murphy & Presser

[57] ABSTRACT

Particulate material to be aromatized is fed to the circumferentially grooved surface of a rotating wheel which carries said material from the in-feed to the discharge stage of its rotation during which travel the material in injected with a predetermined quantity of an aroma-enriched carrier liquid.

4 Claims, 8 Drawing Figures

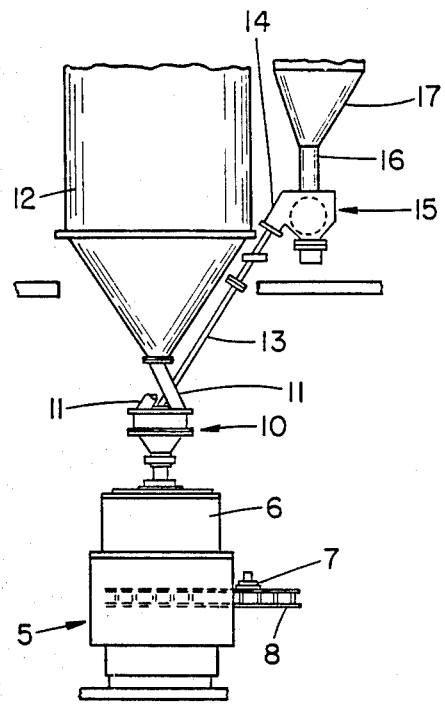
FIG.1
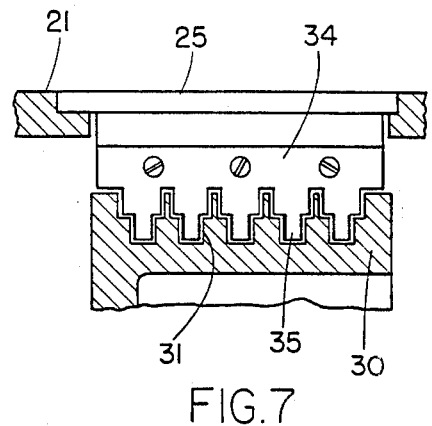
FIG.7
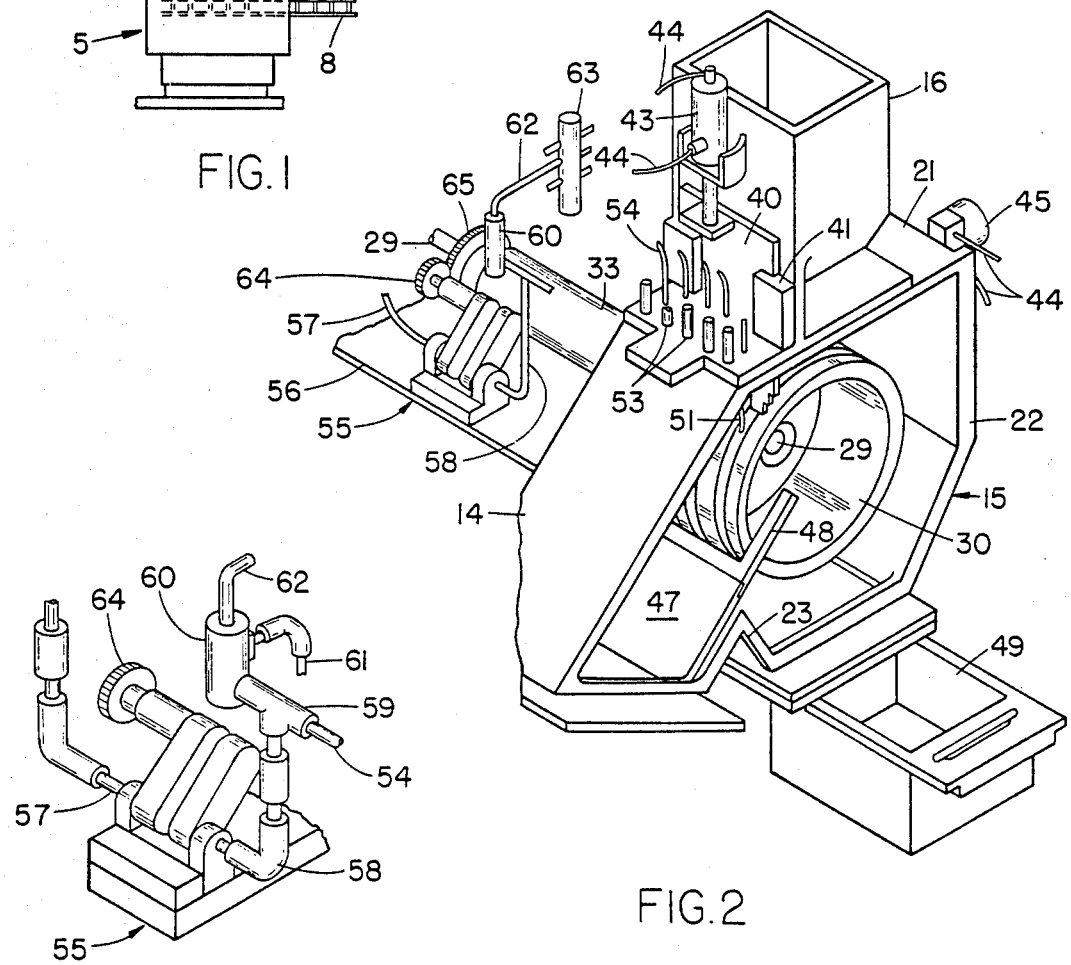
FIG.2
FIG.8

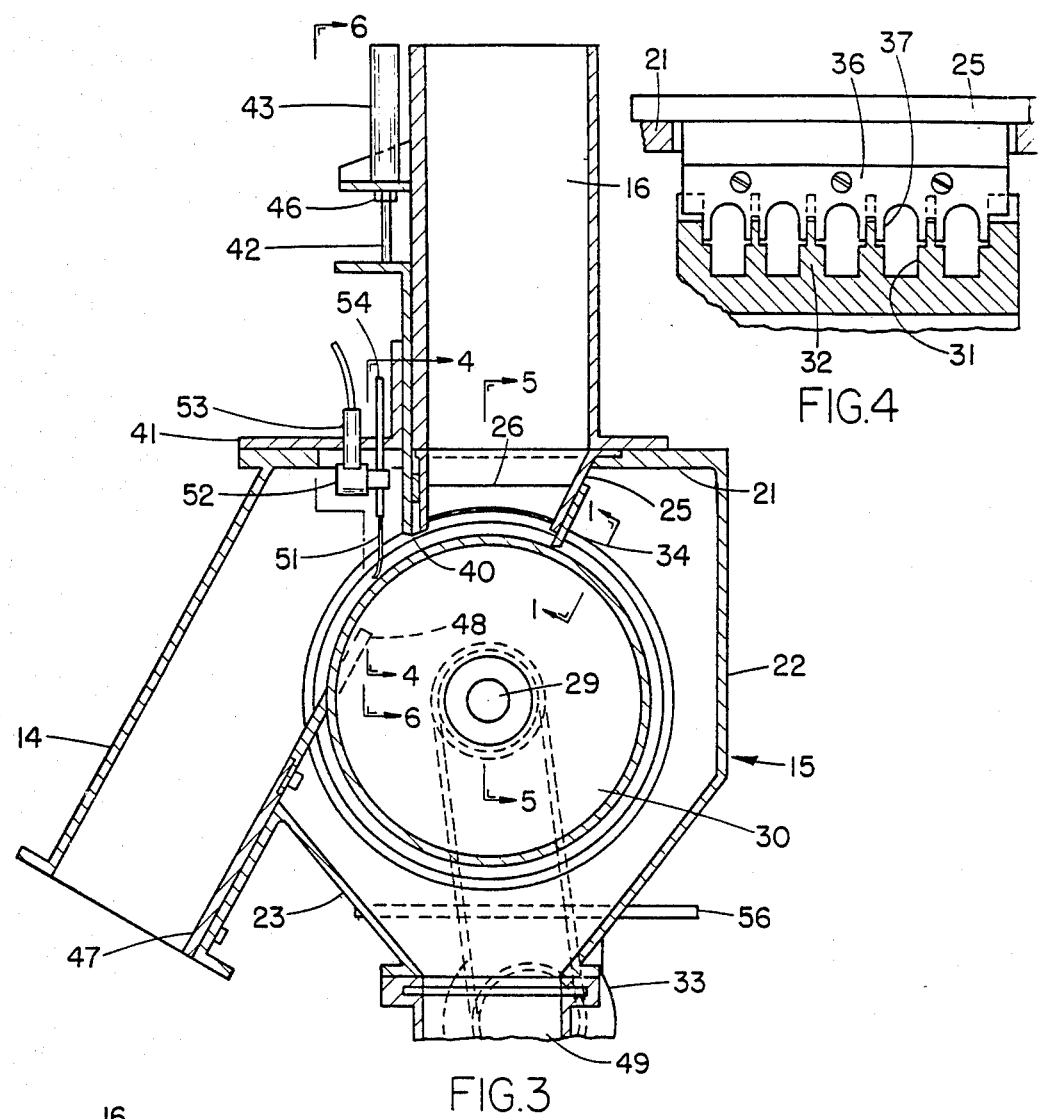
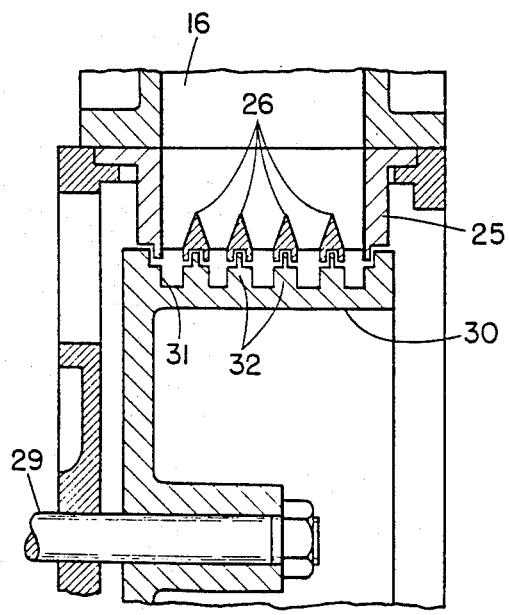
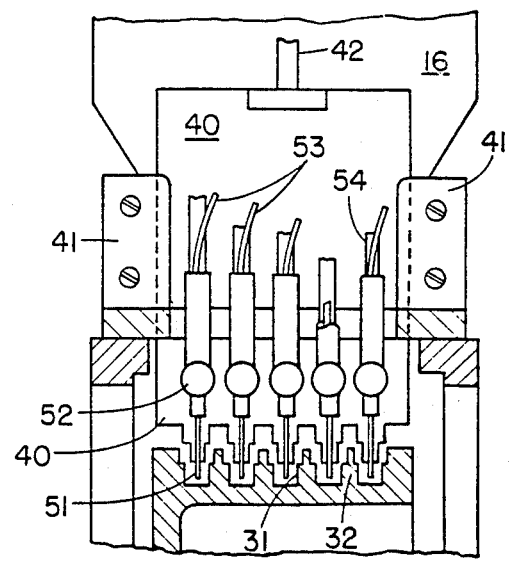

AROMATIZING METHOD

CROSS REFERENCE TO RELATED APPLICATIONS

This application is a divisional application of U.S. Ser. No. 220,927 filed Dec. 29, 1980 which issued on Oct. 26, 1982 as U.S. Pat. No. 4,355,571 entitled "Aromatizing Apparatus".

BACKGROUND OF THE INVENTION

1. Field of the Invention

This invention relates generally to an apparatus and method for treating particulate material supplied in a bulk state by way of combining therewith a minor amount of liquid in a manner to achieve a uniform dispersion thereof throughout the material. More particularly, the invention relates to apparatus and method for enhancing the quality and appeal of a particulate food product and is shown here in an embodiment adapted for aromatizing a soluble coffee product with highly volatile aromas in a liquid carrier such as coffee oil, which aromatizing is accomplished in conjunction with the packaging of said coffee product for sale to the consumer.

In the manufacture of coffee products, especially soluble coffee, it has become a well established practice, particularly with respect to the higher quality products, to reintroduce into the product certain of the aromatics, at least the more desirable ones, which were necessarily lost or stripped from the product during one or more of the processing steps performed thereon. Achieving a successful reintroduction of the desired aromatics and retention thereof in the packaged product has met with problems and difficulties largely arising from the highly volatile nature of the desired aromatics sought to be so captured.

It has been a general practice in the aromatizing art to condense at low temperatures the aromatics recovered from the various processing operations and then add the condensate to a suitable carrier, such as coffee oil or the like, to provide an aroma enriched carrier which is then applied to the product, preferably just prior to packaging of the product.

In adding an aroma enriched carrier to particulate material such as soluble coffee whether it be in a powdery state, agglomerated, or flaked, it is of course important that the liquid carrier be dispersed evenly and uniformly throughout the mass of discrete particles so that not only each package of the product will contain the same amount of aroma enrichment but also that the carrier be dispersed uniformly throughout the product mass within each package. This is particularly true with a food product where the aromatization thereof is a significant factor in the appeal of the product to the consumer thereby rendering it necessary that each portion of the product consumed or removed from a package be aroma-enriched to the same degree. It is also desirable that the aromatization of the product be performed within the shortest possible time lapse before sealing of the product in appropriate containers in order to minimize aroma loss by reason of its highly volatile nature.

Various methods have been employed for plating particulate materials such as soluble coffee with an aroma enriched carrier, and these methods have involved spraying techniques with respect to particulate material being fed on a conveyor belt or dropped in a falling stream or curtain. However, spraying of the enriched carrier regardless of the manner in which the product is fed with respect thereto, presents problems in start-up and stopping operations, adjustments of the spray nozzles, clogging thereof and more importantly with substantial loss of the aromatics due to the atomization of the carrier which tends to strip the aroma therefrom. Other techniques have been to inject the enriched liquid carrier into the product within its container and before the container is sealed. This technique while minimizing the loss of the aromatics to atmosphere through volatization thereof, fails to achieve a uniform dispersion of the aroma enriched carrier throughout the mass of particulate material so contained. The instant invention is concerned with a technique and apparatus improving upon the techniques such as above mentioned for aromatizing a particulate material with a highly volatile aromatic.

2. Description of the Prior Art

A typical apparatus for aromatizing soluble coffee utilizing a spray technology is disclosed in U.S. Pat. No. 3,148,070 issued Sept. 8, 1964 to A. R. Mishkin et al. In the disclosure of this patent soluble coffee in powdered form is supplied to the hopper of a filler in a falling circular stream which surrounds a spray nozzle connected to a supply of an aroma-enriched liquid carrier. The disclosure shows two forms of the apparatus; one where the aromatization is carried out under atmospheric conditions and the other wherein it is carried out in an inert atmosphere. In both forms of the apparatus, atomization of the liquid carrier is called for with consequent loss of the highly volatile aromatic as a result thereof, as heretofore mentioned. The disclosure also teaches the use of separate nozzles connected to separate sources for a liquid carrier and a condensed aromatic for plating the product first with the carrier and then with the aromatic in successive steps.

In U.S. Pat. No. 2,825,190 issued Mar. 4, 1958 to R. F. Heald, apparatus is disclosed for aromatizing a particulate material, in this case soap beads, after being deposited in a container to be sealed. While this minimizes the time in which the material is exposed to atmosphere before being sealed in a container, it employs atomization of the liquid carrier with the heretofore mentioned disadvantages incident thereto and furthermore precludes uniform dispersion of the carrier since the spraying is carried on within a immobile mass of particulate matter.

U.S. Pat. No. 3,769,032, to Timothy A. Lubsen, et al. issued Oct. 30, 1973 also discloses a method for aromatizing a particular material, in this case soluble coffee, after being packed in a container. In this disclosure the liquid carrier is injected into the packed mass in a drop wise or stream-like manner through a syringe or the like which is reciprocated in and out of the mass with the injection being timed to occur while the syringe is being withdrawn from the packed mass of particulate matter. This technique obviously is incapable of achieving uniform dispersion of the relatively minor amounts of carrier liquid throughout the entire mass of packed particulate material.

SUMMARY OF THE INVENTION

In accordance with the invention an aroma enriched carrier is injected as a liquid into the particulate material, in order to avoid the heretofore mentioned disadvantages of atomization of the carrier, but the injection is carried out while the material is still being fed to the filler in a fluid state. The injection is performed within a stream constituting a relatively small fraction of the resultant product being packaged and at a relatively high weight proportion to that of said stream so as to achieve a substantially uniform saturation thereof. The fraction of product represented by said stream is then blended with the remaining fraction so that the resultant mass of material packed in each container will contain plated particles dispersed uniformly therein so as to achieve a more even and equal dispersion of the aroma throughout the packaged mass or volume of product than is possible with the techniques heretofore described.

A precise metering of the aroma enriched carrier into the product stream constituting the fraction thereof being treated is accomplished by passing the said fraction onto the surface of a grooved plating wheel driven in synchronism with the drive of the filler. Gating means associated with the wheel permit a product stream of precise dimensions to be discharged therefrom for blending with the remaining fractions of the final product. Valving means in communication with a source of aroma enriched carrier oil and disposed at said gating means discharges said carrier oil into said stream in precisely measured amounts through the action of pumps driven in synchronism with said plating wheel and said filler. In this manner the stream of particulate matter being treated becomes substantially saturated with the aroma enriched carrier oil and as a result of subsequent blending of said fraction with the remaining fraction of the final product prior to packaging a uniform dispersion of the aromatized or plated particles within the resultant sealed container is achieved.

It is therefore an object of the invention to achieve inproved aromatization of packaged particulate material.

It is a further object of the invention to aromatize particulate material prior to being packaged in a sealed container with minimum loss of aromatics by volatizatiion thereof and with maximum uniformity in the dispersion thereof within said container.

Further objects of the invention together with the features contributing thereto and the advantages accruing therefrom will be evident from the following description when read in conjunction with the drawing wherein:

BRIEF DESCRIPTION OF THE FIGURES

FIG. 1 is a general view of apparatus for filling containers with a particulate product employing the aromatizing or plating mechanism of the instant invention.

FIG. 2 is an isometric view of the plating wheel assembly in accordance with the present invention.

FIG. 3 is a sectional view in elevation of the plating unit shown in FIG. 2.

FIG. 4 is a sectional view along the line 4—4 of FIG. 3.

FIG. 5 is a sectional view along the line 5—5 of FIG. 3.

FIG. 6 is a sectional view along the line 6—6 of FIG. 3.

FIG. 7 is a sectional view along the line 7—7 of FIG. 3.

FIG. 8 is an isometric view of a pump used with the apparatus.

DETAILED DESCRIPTION

Referring now to the drawing, FIG. 1 shows the general layout of equipment for continuously filling containers with particulate material such as soluble coffee or any like product whether it be in a powdery, agglomerated, flaked or other form. The equipment includes a horizontal filler 5 comprising a rotary structure 6 around which suitable containers or jars 7 are conveyed by a conveyor chain 8 during the course of which the containers are filled with a measured amount of product in a manner which is well known.

The product or particulate material to be packaged may be supplied to the filler through a blender 10 which receives the product by gravity feed through a plurality of tubes 11 running to various areas and levels of a supply bin 12. The arrangement provides assurance that the particulate material supplied to the filler 5 is a uniform mixture of the contents of the supply bin wherein the particulates may vary in size, shape, color, etc. to a minor degree. In the present instance, the product or particulate material in the supply bin 12 represents a fraction, albeit the major fraction, of the ultimate product being packaged and is blended or mixed with a minor fraction of product by the blender 10. The minor fraction is plated or aromatized just prior to blending with the major fraction and is gravity fed into the center of the blender by means of a chute or tube 13 running to and in communication with the discharge spout of a plating wheel assembly or aromatizer 15. Said minor fraction is gravity fed to the inlet or infeed chute 16 of the assembly from a surge hopper 17. The arrangement is such that the minor fraction of product which is subjected to aromatization or plating of a manner hereinafter to be described is aromatized or plated with an aroma enriched carrier such as coffee oil at a concentration by weight which may be approximately ten times the desired concentration in the resultant product being packaged. Accordingly, the arrangement and adjustment of the blender is such as to render the minor fraction which is plated to constitute 10% of the resultant product being packaged, the remaining 90% or major fraction being supplied from the supply bin 12 as aformentioned. In the case of a soluble coffee product a typical concentration or a ratio by weight of enriched coffee oil to coffee solids would be in the area of 0.1%. Thus to achieve this level of concentration the minor fraction plated by the mechanism of this invention would be at a concentration in the area of 1.0%. By operating in this manner the minor fraction becomes substantially saturated with the carrier oil with each individual particle of the product being plated or adsorbing the oil to the same extent. Thus by virtue of a blending of a minor fraction with the major fraction, the carrier oil becomes fully mixed and uniformly dispersed throughout the mass of the resultant product fed to the filler so that each jar of product will contain a mass of product with aroma enriched particles completely mixed and uniformly dispersed throughout. For this reason over saturation or excess oil, as well as undersaturation, in any particular area of the jar or product, or the occurrence of blobs of carrier oil is avoided.

The fraction of product to be plated is fed into the housing of the plating wheel assembly 15 which comprises a chamber defined by a top wall 21, rear wall 22 and a front wall 23 which is bent over and is joined to the discharge chute 14. Mounted in an opening in the top wall 21 is a hopper 25, see FIGS. 3 and 5 the bottom of which is formed into a series of spaced longitudinal ribs 26 so as to provide a plurality of spaced longitudinal discharge ports through which the particulate product material passes continuously in equal amounts when the apparatus is in operation.

Disposed immediately beneath the hopper 25, is a plating wheel 30 mounted on a shaft 29 suitable journalled in the assembly structure. The surface of the wheel is ribbed to provide a series of circumferential grooves 31, preferably of right angular outline, separated from one another by rib or land areas 32. Preferably the ribs 32 are notched or stepped forming a shoulder in the side wall of the groove which provides the lower or bottom portion of the groove with a smaller cross sectional area than the upper or top portion of each groove. The arrangement and relationship between the wheel and hopper is such that the grooves are aligned with the discharge outlets or ports in the hopper with the land portions 32 of the wheel aligning with and interfitting with the ribs 26 in the bottom of the hopper 25. The parts in effect dovetail so that when assembled the width of the groove at its top portion when accommodating the interfitting rib 26 is the same as the width of the bottom portion rendering the overall width of the groove uniform.

As will be seen, the particulate product fed into the hopper of the plating wheel assembly is chanelled into the several grooves in the surface of the plating wheel which acts as a bottom surface for the hopper with the segment thereof spanning the hopper being substantially horizontal, since the hopper is located at the top dead center position relative to the wheel. The wheel is continuously driven in a counter clockwise direction as viewed in FIG. 3 by a motor 33 appropriately mounted and coupled to the shaft 29. The wheel 30 is driven in synchronism with the filler 5 and this preferably is accomplished through well-know circuitry which maintains a predetermined speed ratio between the respective motors regardless of the speed variations that may occur during the filling operation. The particulate material is prevented from spilling from the hopper into the housing in a direction counter to the direction of wheel rotation by means of a scraper plate 34 secured to the rear wall of the hopper. The scraper plate, see FIG. 7, is formed with tines 35 shaped to contact all surfaces of the respective grooves and thereby effectively seal the respective wall of the hopper at its interface with the wheel to prevent product spillage thereat.

Mounted on the front wall of the hopper 25, see also FIG. 4, is a scraper plate 36 the tines 37 of which are shaped to accommodate the top portion of the wheel ribs 32 down to the step or shoulder therein and provide a scraping edge therefore. This scraper 36 thus serves to seal off the interface between the hopper and the top of the wheel rib 32 to prevent leakage or spillage of product thereat and restricting the flow of material out of the hopper, by wheel rotation, to that filling the bottom portion of the grooves 31. Also mounted on the front wall of the hopper is a gate 40, see FIG. 6, slide fitted for vertical movement in side guides 41 secured to the front wall of the in-feed chute 16. The top of the gate is bent over and attached thereat to a rod 42 connecting it with the piston of a pneumatic actuator 43 suitably secured also to the front wall of the in feed chute 16. The bottom edge of the gate 40 is formed with tines 39 shaped complementary to and adapted to fit within the grooves 31 of the plating wheel 30 when the gate is in its lowermost position, in which position the discharge port of the hopper is effectively sealed off by the gate. Activation of the actuator 43 from a suitable pressurized air source through lines 44, which may be electrically controlled by a solenoid type valve 45 to operate under various conditions, raises the gate so as to open the discharge outlet of the hopper permitting the product lying within the grooves of the plating wheel to be carried away thereby at a rate determined by the rotational velocity of the wheel.

Preferably means are provided to adjust the open position of the gate thereby precisely determining the size of the discharge opening from the hopper, the adjustment means including a threaded member or nut 46 carried by the connecting rod 42 in a position to abut the mounting bracket for the actuator 43 so as to serve as an adjustable limit for the gate in its open position.

From the foregoing it will be seen that as the plating wheel 30 rotates in a counter-clockwise direction as viewed in FIG. 3, a predetermined amount of the particulate material in the hopper 25 will be carried out of the hopper by the moving wheel, the amount of material being determined by the cross sectional dimensions of the grooves 31 and the open position of the gate 40. The material at this point is carried by the wheel in what may be considered a continuous ribbon, one within each groove, until the material is carried to a point where it starts to fall out of a groove and into the discharge chute 14 by force of gravity, and/or inertia, which point is approximately 45° from the top dead center point of the wheel.

Mounted on the interior wall of the discharge chute 14 is a scraper 47 the edge of which is cut out to form tines 48 disposed to engage these various grooved surface areas of the wheel at a point of about 90° rotation thereof so as to completely strip the ribbon of product from each groove for discharge into the chute 14 and seal the wheel to prevent the particular material from being carried around into the wheel housing. Any fines which may sift through the interface of the scraper 47 and the wheel will drop through the bottom of the housing which is open and beneath which is provided a slideable drawer 49 for collection and periodic removal of any such material that may so accumulate.

The aroma enriched carrier oil is injected as a fluid into the ribbon of particulate material, just as it is carried past the gate 40 while still in a groove of the plating wheel, by a hollow needle 51 or syringe-type tube connected to and in fluid communication with the discharge or outlet port of a solenoid controlled valve (52) of which there is one for each groove of the plating wheel. The valve may be electrically actuated through a line or wire 53 running to a suitable control circuit and is supplied with the aroma enriched carrier oil through a line or tube 54 connected to the outlet of a positive displacement pump 53. The valve 52 is suitably mounted to lie just beneath the top wall 21 of the plating wheel housing, and pump 55 of which there is a separate one for each valve is suitably mounted on a support shelf 56 forming part of the overall assembly structure.

As can be best seen in FIG. 8, each pump 55 is connected at its inlet to a line 57 and discharges the carrier liquid through an outlet line 58 and by way of a T-connector 59 to the line 54 running to the inlet side of the oil carrier injection valve 52 and at the other side of the T-connector to a solenoid controlled valve 60. The outlet of valve 60 is connected by a line 62 to a manifold 63, common to all the pumps, to which manifold is also connected the pump inlet line 57. The drive for each pump includes a gear 64 engaging a respective drive gear 65 carried by the plating wheel drive shaft 29. Each valve 60 is electrically controlled through an electrical conductor 61 running to a suitable control circuit, not shown, but which operates when the groove of the plating wheel is not being utilized to open valve 60 allowing the carrier oil to circulate to and from the manifold and which, when the respective groove of the plating wheel is operative, to interrupt said recirculation and direct the pumped carrier oil to the respective injector valve 52. The control circuitry opens valve 52 concomitantly with the closing of valve 60 providing a flow of carrier oil through the injector needle at a predetermined pressure and flow rate so as to thereby plate the particulate material at the respective groove of the plating wheel with a predetermined quantity of the carrier oil calculated to achieve the desired saturation level. Since the pumps are of the positive displacement type and are driven from the shaft of the plating wheel which in turn is driven in synchronism with the filler, it will be apparent that the quantity of carrier oil injected into the particulate material at each groove of the plating wheel will be at a constant weight to weight proportion with the product material since any variation, such as an increase or decrease in the speed of the filler, will in turn be reflected in the speed of the plating wheel which in turn will result in a proportionate variance in the amount of oil being injected into the material being carried out of the plating wheel hopper.

It will be noted that the discharge tip of the injector needle 51 is disposed centrally of the lower portion of its respective groove 31 in the plating wheel which contributes to the even and uniform plating of all the particles of the particulate material within the groove as it is being carried and discharged into the discharge chute or spout of the plating wheel assembly. Any of the particulate material which fails to leave its respective groove by reason of gravity or centrifugal forces, etc., is positively displaced from its respective groove by the scraper 47 the tines 48 of which contact all grooved surfaces so as to clear each groove of the particular material before rotating past the discharge stage of its rotation.

In the embodiment herein shown, the plating wheel 30 is provided with five grooves 31 each with an associated pump injection valve, etc., but which number is arbitrary and is shown as a matter of convenience or flexibility in enabling the apparatus to be adjusted to meet varying filling needs and container sizes. The injector principles here involved apply the same way, whether the wheel has one groove or a plurality thereof. By providing five grooves it enables the wheel to be easily adjusted to a change-over in container sizes such as from a two oz. jar being filled which could be accomplished by a wheel with only one groove to a two, four, six, eight or ten oz. jar size which could be accomplished by using a corresponding additional number of grooves; five grooves being utilized in the case of a ten oz. container or jar. In cases where less than all five grooves are employed an appropriate modification of the hopper 25 is substituted with a fewer number of ribs to provide a fewer number of discharge ports whether it be two, three or four, as the case may be. Of course, when fewer than all five grooves are utilized in the case of smaller sized containers being filled, the circuitry enables selective disabling of the ejector valves 52 for the grooves of the wheel not in use.

In utilizing the apparatus herein disclosed for the plating of soluble coffee with an aroma-enriched carrier oil, it has been found that a preferred weight-to-weight proportion of carrier oil to the particular coffee particles is in the area of 0.1%. Under these circumstances it has been found that, by plating a 10% fraction of the final product at a weight-to-weight proportion of approximately 1.0% and then blending the plated 10% fraction with the remaining 90% fraction, a highly satisfactory and uniform distribution of the carrier oil with the particulate material is achieved. This is due in large part to the fact that the particulate material actually being plated is done so at a relatively higher saturation level than has been customary, thus giving assurance that each particle being plated receives substantially the same amount of saturation. Accordingly, when the fraction thus uniformly plated is thoroughly blended with the remaining fraction of the final product, said final product is assured a uniform and even dispersion of the aromatic throughout its entire mass.

While there has been shown and described what is considered to be a preferred embodiment of the invention, it is, of course, understood that changes in structural detail or form could obviously be made without departing from the spirit of the invention. It is therefore intended that the invention be not limited to the exact form and structural detail herein shown and described, nor to anything less than the whole of the invention herein disclosed as hereinafter claimed.

What we claim is:

1. A method for aromatizing a mass of adsorbent coffee particulates with a carrier oil enriched with a coffee aroma, comprising the steps of, feeding said coffee particulates onto the surface of a circular member having a peripheral groove formed therein, rotating said member to advance the particulates contained within said groove from an in-feed position to a discharge position to form a continuously moving ribbon of coffee particulates, scraping from the surface of said member said particulates other than that contained within said groove during the advance rotation thereof between said positions, and injecting into the continuously moving ribbon of coffee particulates within said groove before reaching said discharge position, a predetermined amount of said carrier oil enriched with coffee aroma.

2. The invention according to claim 1, wherein said injecting is accomplished through positive displacement of said carrier oil by means driven in synchronism with the rotation of said member.

3. The invention according to claim 1 wherein the particulates injected with said carrier oil represents a fraction of a final product of similar particulates desired to be aromatized at a predetermined liquid to solids weight ratio, and including the step of blending the particulates injected with said carrier oil with said similar particulate material representing the other fraction of said final product at a predetermined flow rate to achieve said desired liquid to solids weight ratio in said final product.

4. The invention according to claim 3 wherein said particulates injected with said aroma-enriched carrier oil represents a smaller fraction of said final product than does said similar material, and the injection thereof is accomplished at a correspondingly higher liquid to solids weight ratio than that of said final product.

* * * * *